(12) United States Patent
Munday et al.

(10) Patent No.: US 7,789,398 B2
(45) Date of Patent: Sep. 7, 2010

(54) HYDRAULIC SYSTEM FOR A VEHICLE SUSPENSION

(75) Inventors: Raymond Andrew Munday, Busselton (AU); Richard Monk, Busselton (AU)

(73) Assignee: Kinetic Pty., Ltd., Dunsborough, W.A. (AU)

( * ) Notice: Subject to any disclaimer, the term of this patent is extended or adjusted under 35 U.S.C. 154(b) by 1121 days.

(21) Appl. No.: 10/546,885

(22) PCT Filed: Feb. 27, 2004

(86) PCT No.: PCT/AU2004/000250
§ 371 (c)(1),
(2), (4) Date: Jun. 13, 2006

(87) PCT Pub. No.: WO2004/076211
PCT Pub. Date: Sep. 10, 2004

(65) Prior Publication Data
US 2006/0237942 A1 Oct. 26, 2006

(30) Foreign Application Priority Data
Feb. 27, 2003 (AU) ............................. 2003900894

(51) Int. Cl.
B60G 17/016 (2006.01)
B60G 17/04 (2006.01)

(52) U.S. Cl. .............. 280/5.507; 280/5.506; 280/5.513; 280/124.16

(58) Field of Classification Search .............. 267/64.15; 280/5.504–5.508, 5.512, 5.513, 5.515, 124.157, 280/124.16–124.162
See application file for complete search history.

(56) References Cited

U.S. PATENT DOCUMENTS 2,184,202 A * 12/1939 Tschanz ................... 280/5.506

(Continued)

FOREIGN PATENT DOCUMENTS

AU 70599 96 A 5/1997

(Continued)

OTHER PUBLICATIONS

Office Action in corresponding Chinese patent application No. CN 200480009340.5 dated Dec. 7, 2007.

(Continued)

Primary Examiner—Paul N Dickson
Assistant Examiner—Laura Freedman
(74) Attorney, Agent, or Firm—Harness, Dickey & Pierce, PLC

(57) ABSTRACT

A hydraulic system for a vehicle suspension for a vehicle, the vehicle including a vehicle body and at least two forward and two rearward wheel assemblies, the vehicle suspension including front and rear resilient vehicle support means between the vehicle body and the wheel assemblies for resiliently supporting the vehicle above the wheel assemblies, the hydraulic system including: at least two front (11, 12) and two rear (13, 14) wheel rams respectively located between the wheel assemblies and the vehicle body, each ram (11 to 14) including at least a compression chamber (45 to 48) and a rebound chamber (49 to 52); wherein the compression chamber (45, 46) and rebound chamber (49, 50) of each said front wheel ram (11, 12) is in fluid communication with the rebound chamber (47, 48) and compression chamber (51, 52) respectively of a diagonally opposed said rear wheel ram (13, 14) to respectively provide two fluid circuits, each fluid circuit providing a front and back compression volume therein, the front compression volume of each said fluid circuit being in fluid communication with the back compression volume of the other said fluid conduit, and wherein damping means (53 to 56, 71, 72) are provided for damping fluid flow within each compression volume and between the front and back compression volumes such that suspension parameters provided by the hydraulic system, including roll stiffness, roll damping, pitch damping and heave damping, can be independently tuned from each other.

16 Claims, 11 Drawing Sheets

U.S. PATENT DOCUMENTS

| | | |
|---|---|---|
| 3,752,497 A | 8/1973 | Enke et al. |
| 3,885,809 A * | 5/1975 | Pitcher .................... 280/5.508 |
| 4,270,771 A * | 6/1981 | Fujii ....................... 280/5.514 |
| 4,761,022 A * | 8/1988 | Ohashi et al. ............ 280/5.504 |
| 4,973,080 A * | 11/1990 | Ikemoto et al. .......... 280/5.501 |
| 5,040,823 A | 8/1991 | Lung |
| 5,144,559 A * | 9/1992 | Kamimura et al. ............ 701/37 |
| 5,219,181 A * | 6/1993 | Lund ....................... 280/5.508 |
| 5,447,332 A * | 9/1995 | Heyring ............... 280/124.104 |
| 5,480,188 A * | 1/1996 | Heyring ............... 280/124.104 |
| 5,556,115 A * | 9/1996 | Heyring ................... 280/6.158 |
| 5,601,306 A * | 2/1997 | Heyring ................... 280/5.508 |
| 5,919,240 A * | 7/1999 | Ney et al. ..................... 701/37 |
| 6,010,139 A | 1/2000 | Heyring et al. |
| 6,270,098 B1 | 8/2001 | Heyring et al. |
| 6,519,517 B1 * | 2/2003 | Heyring et al. ................ 701/37 |
| 7,686,309 B2 * | 3/2010 | Munday et al. .......... 280/5.507 |
| 2006/0151969 A1 * | 7/2006 | Revill et al. ........... 280/124.106 |
| 2008/0129000 A1 * | 6/2008 | Munday et al. .......... 280/5.502 |
| 2008/0272561 A1 * | 11/2008 | Monk et al. .............. 280/5.507 |
| 2009/0140501 A1 * | 6/2009 | Taylor et al. ............. 280/5.508 |

FOREIGN PATENT DOCUMENTS

| | | |
|---|---|---|
| CN | 1146183 | 3/1997 |
| FR | 1 256 864 A | 3/1961 |
| FR | 1535641 | 8/1968 |
| FR | 1535641 A | 6/1979 |
| RU | 2 145 284 | 2/2000 |
| WO | 93/01948 A1 | 2/1993 |
| WO | WO 93/01948 | 2/1993 |
| WO | WO 95/23076 | 8/1995 |
| WO | 00/61394 A1 | 10/2000 |
| WO | WO 00/61393 A | 10/2000 |

OTHER PUBLICATIONS

Office Action in corresponding Russian patent application No. 2005129986/11 dated Dec. 6, 2007.

Supplemental European Search Report from corresponding European Patent Application No. 04715204.6-2421 dated Feb. 6, 2008.

* cited by examiner

HYDRAULIC SYSTEM FOR A VEHICLE SUSPENSION

The present invention is generally directed to suspension systems for vehicles, and in particular to a hydraulic system providing control of one or more suspension parameters.

There are known many alternative interconnected suspension systems which have the ability to passively differentiate between different modes of wheel motion with respect to the vehicle body and therefore provide a variety of alternatives in functionality. For example, the applicants U.S. Pat. No. 6,270,098 provides a pressure balancing "load distribution" unit between two pairs of diagonally interconnected double acting wheel rams. This system provides different heave, roll and pitch stiffness rates with zero warp stiffness and different damping rates in all four base suspension modes (heave, roll pitch and warp). This system supports the weight of the vehicle, so as the loads on the vehicle change, or as the fluid temperature changes, the volume of fluid in each of the six volumes in the system must be adjusted. Also, as the six volumes in the system can in some load conditions, all be at different pressures, there is the possibility for fluid to leak across seals, which also requires fluid volume adjustments to be made to maintain the correct vehicle attitude. This requires a high pressure fluid source, sensors, control electronics and valves, making the cost of the system relatively high for a passive system.

An example of a passive system providing high roll stiffness with low warp stiffness and negligible heave stiffness and providing high roll damping with lower, more comfortable and isolating heave damping can be found in the applicant's PCT/AU00/00312. As the system does not provide significant heave stiffness, separate support springs are required.

The support means may provide varying degrees of roll stiffness from conventional independent support means providing roll stiffness through to completely interconnected support means providing zero roll stiffness. Details of examples of support means with varying degrees of roll stiffness that can be packaged in current vehicle designs are shown in the applicant's U.S. Pat. No. 6,217,047 and incorporated herein by reference.

The variations of support means shown in U.S. Pat. No. 6,217,047 with an anti-roll bar roll control system are also suitable for use not only with that anti-roll bar system and with the hydraulic system of PCT/AU00/00312, but with any roll control system.

An example of a system having just roll and/or pitch damping can be found in Yamaha's U.S. Pat. No. 5,486,018 and Kayaba's U.S. Pat. No. 6,024,366. The system in these documents uses a device between a pair of wheel damping rams, each wheel damping ram having a damper valve in its piston to provide double-acting damping but make the ram single-acting (i.e. there is only fluid port). The device provides for independent levels of damping for in-phase (i.e. heave) and out of phase (i.e. roll and/or pitch) motions. However this system does not provide significant stiffness in any mode, so in addition to the need for support springs, generally anti-roll bars will be required for a good balance between bounce and roll stiffness. Additionally, as the wheel rams are effectively single acting (having only one fluid port) the amount of damping that the device can provide is limited. There are improvements made to the system to combat this problem, which can be found in Japanese patent office publication number 11291737, but these add to the complexity of the system by providing more plumbing and spool valves.

It is therefore an object of the present invention to provide a hydraulic system for a vehicle suspension that may overcome at least one of the disadvantages of earlier vehicle suspension systems.

It is a preferred object of the present invention that the hydraulic system provide roll stiffness, roll damping, pitch damping and heave damping, all of which can be designed and tuned substantially independently from each other to enable optimisation of each parameter.

With this in mind, according to one aspect of the present invention there is provided a hydraulic system for a vehicle suspension for a vehicle, the vehicle including a vehicle body and at least two forward and two rearward wheel assemblies, the vehicle suspension including front and rear resilient vehicle support means between the vehicle body and the wheel assemblies for resiliently supporting the vehicle above the wheel assemblies, the hydraulic system including:

at least two front and two rear wheel rams respectively located between the wheel assemblies and the vehicle body, each ram including at least a compression chamber and a rebound chamber;

wherein the compression chamber and rebound chamber of each said front wheel ram is in fluid communication with the rebound chamber and compression chamber respectively of a diagonally opposed said rear wheel ram to respectively provide two fluid circuits, each fluid circuit providing a front and back compression volume therein, the front compression volume of one said fluid circuit being in fluid communication with the back compression volume of the other said fluid circuit, and wherein damping means are provided for damping fluid flow within each compression volume and between the front and back compression volumes such that suspension parameters provided by the hydraulic system can be independently tuned from each other.

The hydraulic suspension system according to the present invention allows for the independent tuning and design of suspension parameters including roll stiffness, roll damping, pitch damping and heave damping. This enables optimisation of as many of these suspension parameters as possible.

The vehicle may be primarily supported by the resilient vehicle support means.

The vehicle support means may be any known support means such as coil springs, air springs, torsion bars, leaf springs and rubber cones. The vehicle support means can, in the case of coil springs and air springs, be mounted around the wheel rams or mounted separately.

Additional valves may be provided to block the two fluid circuits for failsafe and/or wheel lift lockouts.

As the vehicle support means are the primary means of vehicle support, all of the volumes in the damping and stiffness system can be run at the same pressure. Also, as the system contains hydraulic fluid and gas, both of which expand with increasing temperature, a pressure compensation arrangement is required in order to maintain the system static pressure and roll stiffness within a design range over the design temperature. This pressure compensation arrangement can also be used to compensate for any fluid loss over time. Therefore, there is provided a pressure maintenance device connected to each of the system volumes through respective restrictions or valves. For example, the pressure maintenance device may be connected to the left and right compression volumes.

The accompanying drawings illustrate preferred embodiments of the present invention. Other arrangements are possible, and consequently the particularity of the accompanying drawings is not to be understood as superseding the generality of the preceding description of the invention.

In the drawings:

FIG. 1 is a schematic view of a first preferred embodiment of a hydraulic system having roll stiffness and roll and pitch damping, according to the present invention;

FIG. 2 is a schematic view of a variation of the first preferred embodiment of the hydraulic system;

FIG. 3 is a schematic view of another variation to the first preferred embodiment of the hydraulic system;

FIG. 4 is a schematic view of a second preferred embodiment of a hydraulic system according to the present invention, being similar to the first embodiment, having the same connection sequence, but with different routing of the conduits;

FIG. 5 is a schematic view of a variation to the second preferred embodiment of the hydraulic system;

FIG. 6 is a schematic view of a variation of the system of FIG. 5 and additionally shows a pressure maintenance arrangement;

FIG. 7 is a perspective view of the system of FIG. 6 with the components in location on a vehicle, but the vehicle components are omitted for clarity; and FIG. 8 is a schematic view of a variation to the hydraulic system shown in FIG. 5 to provide a failsafe and also incorporates pressure maintenance.

FIG. 9 is a schematic view of a variation to the hydraulic system of FIG. 6.

FIG. 10 is a schematic view of a third preferred embodiment of a hydraulic system according to the present invention, being similar in layout and connection sequence to FIG. 9, but with the accumulators located at different connection points in the system.

FIG. 11 is a schematic view of a fourth preferred embodiment of a hydraulic system according to the present invention with a similar connection sequence to the earlier arrangements, but having a different arrangement of pitch and accumulator damper valves.

DESCRIPTION OF THE DRAWINGS

Referring initially to FIG. 1, there is shown a suspension system for a vehicle. Four wheel rams (11, 12, 13, 14) are located between the vehicle body (not shown) and four orthogonally disposed wheels (not shown) of the vehicle. Each wheel ram includes a cylinder (15, 16, 17, 18) connected to a wheel hub or other suspension geometry to move with the wheel, a piston (19, 20, 21, 22) slidably housed within the cylinder, and a rod (23, 24, 25, 26) fixed between the piston and the body of the vehicle. The connection of the rod to the vehicle body may be by any known means, usually through a rubber bushing which in the case of MacPherson strut geometry usually includes a bearing.

For ease of understanding, the vehicle resilient support means are shown as "coil-overs", ie coil springs (27, 28, 29, 30) positioned around the wheel ram and located between a lower spring plate (31, 32, 33, 34) fixed to the cylinder and an upper spring plate (35, 36, 37, 38) which may be connected to the vehicle body or the rod (directly or indirectly such as via a bearing or bushing). It should be understood that the resilient support means may be of any alternative known type such as for example air springs and may be located around the cylinder as shown with the coil springs or separate to the ram, which broadens the alternatives, for example, to torsion bars connected to the geometry providing wheel location. Also the wheel ram may be inverted with the cylinder inside an outer tube, the rod being fixed to the outer tube which in turn supports the lower spring plate—the upper spring plate then being mounted either to the cylinder or directly to the body.

Figure 1:
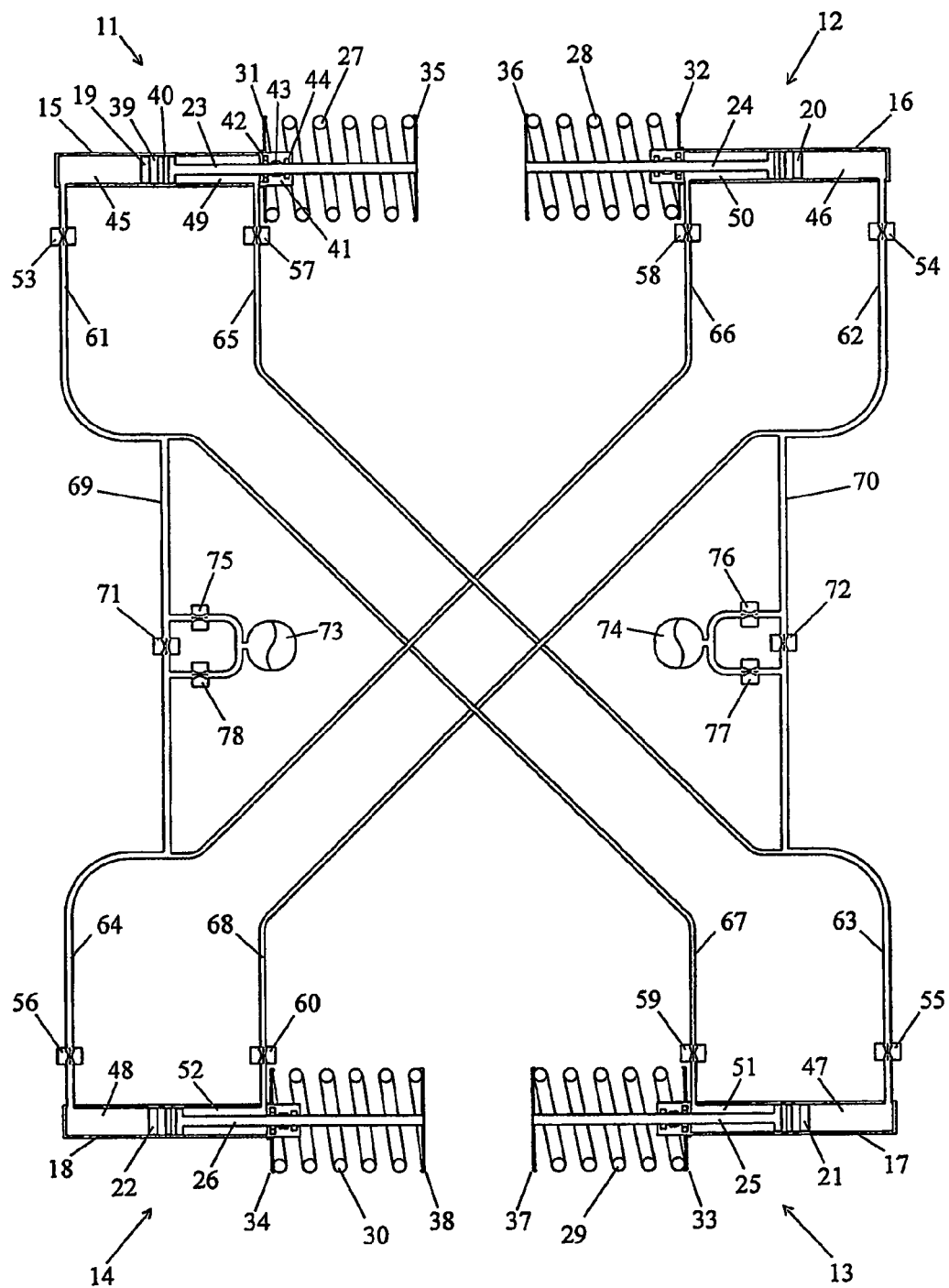

The wheel rams shown in the figures are basically conventional double-acting rams for simplicity. Taking the front left wheel ram 11 as an example, the piston 19 (which may be formed as an integral part of the rod 23) has two grooves containing a bearing 39 and a seal 40. In some cases, the individual bearing and seal parts can be replaced by a single item (not shown) which may be bonded to or formed around the piston for ease of assembly and low cost. The cylinder end (41) has three grooves containing a rod seal 42, a bearing 43 and a rod wiper 44 or other form of secondary seal such as an excluder. Each ram therefore has a compression chamber (45, 46, 47, 48) and a rebound chamber (49, 50, 51, 52) formed by the piston (19, 20, 21, 22) within each cylinder (15, 16, 17, 18).

The direct damping of each wheel ram can be accomplished by the provision of compression (53-56) and rebound (57-60) damper valves mounted on conduits (61-66) close to the compression and rebound chambers of each wheel ram. These damper valves can be single-acting, working on restricting fluid flow out of either a compression or a rebound chamber, or they may be double acting, in which case only one valve (on either the compression or preferably on the rebound chamber) may be utilised. These damper valves can be located in the wheel ram body where there is package space, or attached to the wheel ram body or in the conduits as shown.

The direct damping of each wheel ram may alternatively be accomplished by the provision of damper valves/arrangements, within each wheel ram.

The four double-acting wheel rams are connected by a pair of diagonal circuits to provide passive de-coupling of roll and pitch stiffness from heave stiffness. The first diagonal circuit comprises two fluid volumes, a front left compression volume and a back right compression volume. The front left compression volume includes the front left compression chamber 45, a front left compression conduit 61, a back right rebound conduit 67 and a back right rebound chamber 51. The back right compression volume similarly includes a back right compression chamber 47, a back right compression conduit 63, a front left rebound conduit 65 and a front left rebound chamber 49.

The second diagonal circuit similarly comprises two fluid volumes, a front right compression volume and a back left compression volume. The front right compression volume includes the front right compression chamber 46, a front right compression conduit 62, a back left rebound conduit 68 and a back left rebound chamber 52. The back left compression volume similarly includes a back left compression chamber 48, a back left compression conduit 64, a front right rebound conduit 66 and a front right rebound chamber 50.

This simple diagonal connection arrangement would displace fluid as follows: in roll and pitch, fluid volumes corresponding to a compression chamber and the annular rebound chamber of the diagonally opposite wheel ram are displaced (into or out of any resilient device such as an accumulator); whereas in heave, only a fluid volume corresponding to a rod volume (compression chamber minus annular rebound chamber) would be displaced (into or out of the resilient device). The high relative volume displaced in the roll and pitch modes relative to heave gives a higher roll and pitch stiffness than heave stiffness.

However the first and second diagonal circuits are connected by first and second pitch conduits (69, 70). The front left compression volume is, connected to the back left compression volume by the first pitch conduit (69) forming a left compression volume and the front right compression volume is connected to the back right compression volume by the second pitch conduit (70) forming a right compression volume. The piston seals on the pistons in each wheel ram (11-14) provide the seal between the left and right compression volumes. If the fluid flow along the first and second pitch conduits (69, 70) is completely restricted or blocked, the pitch stiffness of the basic arrangement of the two diagonal circuits remains, as does the warp stiffness. It should be noted that while the pitch stiffness is related to the roll stiffness, it is therefore high, but the warp stiffness is related to the heave stiffness and is therefore low. If there is any flow permitted along the first and second pitch conduits, then the pitch stiffness is removed, but damping of the flow along the first and second pitch conduits gives damping to pitch motions of the hydraulic system and therefore the vehicle. To this end there is shown, in-line on each of the first and second conduits, a pitch damper valve (71, 72). This pitch damper valve may be a passive orifice, a passive multi-stage damper valve or any form of variable damper valve and may even provide for complete blocking of the pitch conduits. The pitch damper may be a single, double-acting valve or two single-acting valves and may include a lock-off or blocking valve or any other known form of controllable restriction. Alternatively, the pitch damper may be of any known form, such as a simple switched damper incorporating a switchable bypass around each pitch damper valve or a simple controlled bleed orifice.

One arrangement for providing resilience in the two volumes (left and right) is to provide a single accumulator (73, 74) for each volume. In order to provide a higher amount of roll damping than heave damping, the connection between each accumulator and the associated volume must include a damper valve. To be able to tune the front and rear roll damping, a front roll damper valve (75, 76) and a rear roll damper valve (77, 78) may be provided for each accumulator (73, 74). These roll damper valves may also be passive or controlled, the control being of any known form, from a simple switched damper valve to a completely continuously variable damper valve. The simple switched damper valve may be of any known type such as a switchable bypass around each roll damper valve or a simple controlled bleed orifice.

Indeed at every point where there is a damper indicated in the Figure, that damper valve can be either: a single damper valve having the same characteristics in both directions; a single valve having different characteristics from one direction of fluid flow to the other; a single valve having flow restriction characteristics in one direction and being relatively free-flowing in the opposite direction; two single-acting valves, one damper valve to control the restriction to flow in one direction and a second damper valve to control the restriction to flow in the opposite direction, the two valves being used in parallel, or in series with a non-return valve in parallel with each valve as is known in conventional damper valve technology.

The operation of the hydraulic system is basically as follows:

In heave, fluid volumes corresponding to the left and right rod volumes are displaced into or out of the accumulators. The rod volumes are generally small in relation to the accumulator gas volumes, so the pressure change in heave is also small, which acting over the rod areas, provides little change in wheel force. Therefore the hydraulic system has a very low heave stiffness.

In warp, fluid volumes corresponding to the rod volumes from one diagonal circuit are passed into the other diagonal circuit through the first and second pitch conduits (69, 70). Therefore the hydraulic system has negligible warp stiffness.

In roll, for example when making a right turn causing the vehicle to roll to the left, the left compression sealed volume increases in pressure (due to fluid from the left compression chambers 45, 48 and the right rebound chambers 50, 51 entering the accumulator 73) and the right compression volume reduces in pressure (due to fluid entering the right compression chambers 46, 47 and the left rebound chambers 49, 52 from the accumulator 74) thereby providing the necessary roll couple.

In pitch, for example when braking, fluid is displaced out of the front ram compression chambers 45, 46 and out of the back ram rebound chambers 51, 52. This fluid flows through the first and second pitch conduits (69, 70) and is hence transferred into the expanding rear ram compression chambers 47, 48 and the front ram rebound chambers 49, 50. As can be readily understood, in braking (or in any similar direction pitch motion of the wheels with respect to the vehicle body), fluid flows in this single direction through the first and second pitch conduits and the pitch damper valves. During pitch motions of the opposite sense, for example when accelerating, fluid flows in the opposite direction through the first and second pitch conduits and the pitch damper valves. Therefore it is preferable to use different damper characteristics for flow in the two different pitch directions, to thereby give independent control of the braking direction pitch damping and the acceleration direction pitch damping. This is obviously desirable as the pitch velocities, accelerations, peak forces and general requirements (such as trade off between forces for control and comfort) can be very different in the two directions.

If the vehicle pitches with no change of average height and if the rod volumes are of equal size front to rear, then there is no net change in fluid volume in the system (excluding accumulators) so there is no pitch stiffness. However, if the rod volumes are not matched front to rear for a pure pitch motion, there can be a small pitch stiffness introduced by the hydraulic system.

Depending on the roll moment distribution of the hydraulic system, the front and rear chamber volume changes may or may not be matched. If the roll moment distribution is close to 50% then the pitch damping provided can be of similar magnitude at both ends of the vehicle. If the roll moment distribution of the hydraulic system is not 50%, or due to geometry or other effects, the pitch dampers may produce a larger magnitude of damping force on one end of the vehicle than the other. The wheel damper valves can be used to compensate for any difference in front to rear pitch damper effect, especially as this difference is usually in the same direction as any imbalance in roll damping, which can also be additionally provide by the wheel damper valves, the hydyraulic system still providing a better compromise than a conventional suspension system.

So in pitch, the fluid transferred from front to rear along the first and second pitch conduits (69, 70) passes through the pitch damper valves (71, 72) thereby providing pitch damping. The fluid can also pass through the front and rear roll damper valves (75, 77 and 76, 78) which are parallel with the pitch damper valves (71, 72) and can enter the accumulators (73, 74). The overall pitch damping provided for a given input is therefore dependent on the flow restriction and pressure balance between the pitch damper valves, the roll damper valves and the accumulators.

As the roll moment distribution of the hydraulic system may not match the roll moment distribution of the suspension system as a whole (due to the coil spring rates, front to back bushing stiffness differences, etc) it may be necessary to provide different levels of roll damping on the front wheels compared to the back wheels. This can be done as shown in FIG. 1 by using separate front and rear roll damping valves either side of the pitch damping valve. However, it is possible on some vehicles to gain additional roll damping at one end of the vehicle using a simpler arrangement as shown in FIG. 2.

Figure 2:
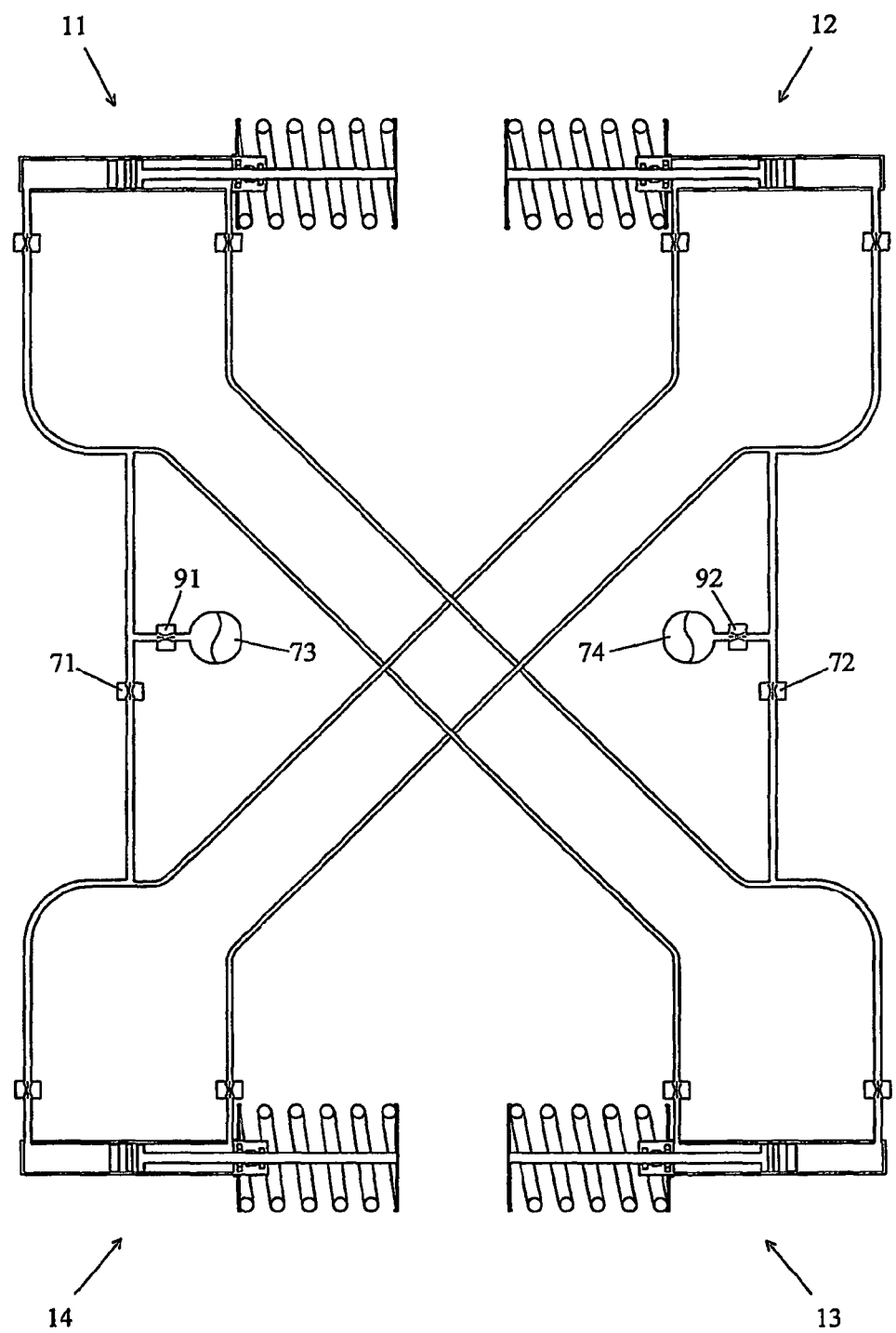

In FIG. 2, there is only one roll damper valve (91, 92) for each accumulator (73, 74). Each accumulator is connected to the respective pitch conduit (69, 70) through this single roll damper valve and forward of the pitch damper valve (71, 72) in the pitch conduit. This ensures that the pitch damper valve (71, 72) acts with the roll damper valve (91, 92) to increase the roll damping on the back wheel rams (13, 14) in relation to the roll damping provided by only the roll damper valve (91, 92) acting on the front wheel rams (11, 12). This gives additional roll damping on the rear wheel rams which can be desirable, as discussed above for FIG. 1. As with the FIG. 1 arrangement with a similar roll damping distribution, it also gives stronger pitch damping to the end of the vehicle with the highest roll damping from the hydraulic system.

Figure 3:
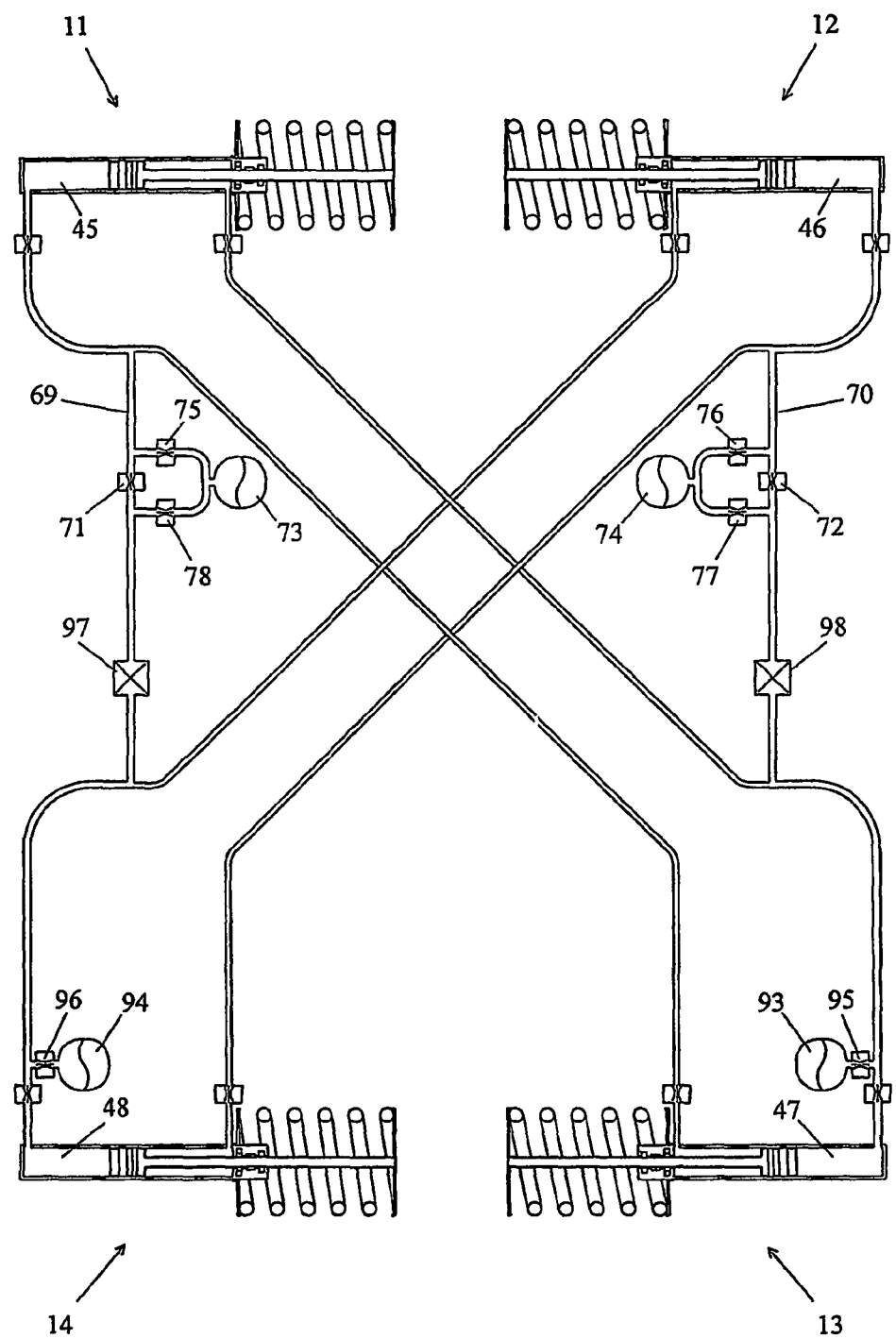

FIG. 3 shows another modification to the basic arrangement of FIG. 1. Here the accumulators have been moved towards the front wheel rams to reduce the distance between the front compression chambers and the accumulators, which can reduce fluid acceleration effects when there is a significant forward bias in the roll moment distribution of the system. To reduce the distance between the rear compression chambers (47, 48) and an accumulator, additional rear accumulators 93, 94 with roll damping valves 95, 96 can be added as shown. When the rear accumulators are added, it can be preferable to replace the front accumulator and roll damper in parallel with the pitch damper valve arrangement shown with the simpler single roll damper and accumulator in front of the pitch damper valve arrangement from FIG. 2.

FIG. 3 also shows another modification to FIGS. 1 and 2, including a lockout valve (97, 98) in each of the first and second pitch conduits (69, 70). When these lockout valves are closed, the operation of the system reverts to that of two independent diagonal pairs of volumes. The mechanism used to generate the roll stiffness also now generates a pitch stiffness and the hydraulic system also has a warp stiffness. The lockout valves can reduce wheel lift, but have the additional advantage of returning the system to four hydraulic volumes so if there is a failure—closing the valves should leave 3 volumes operational for a limp home mode.

Figure 4:
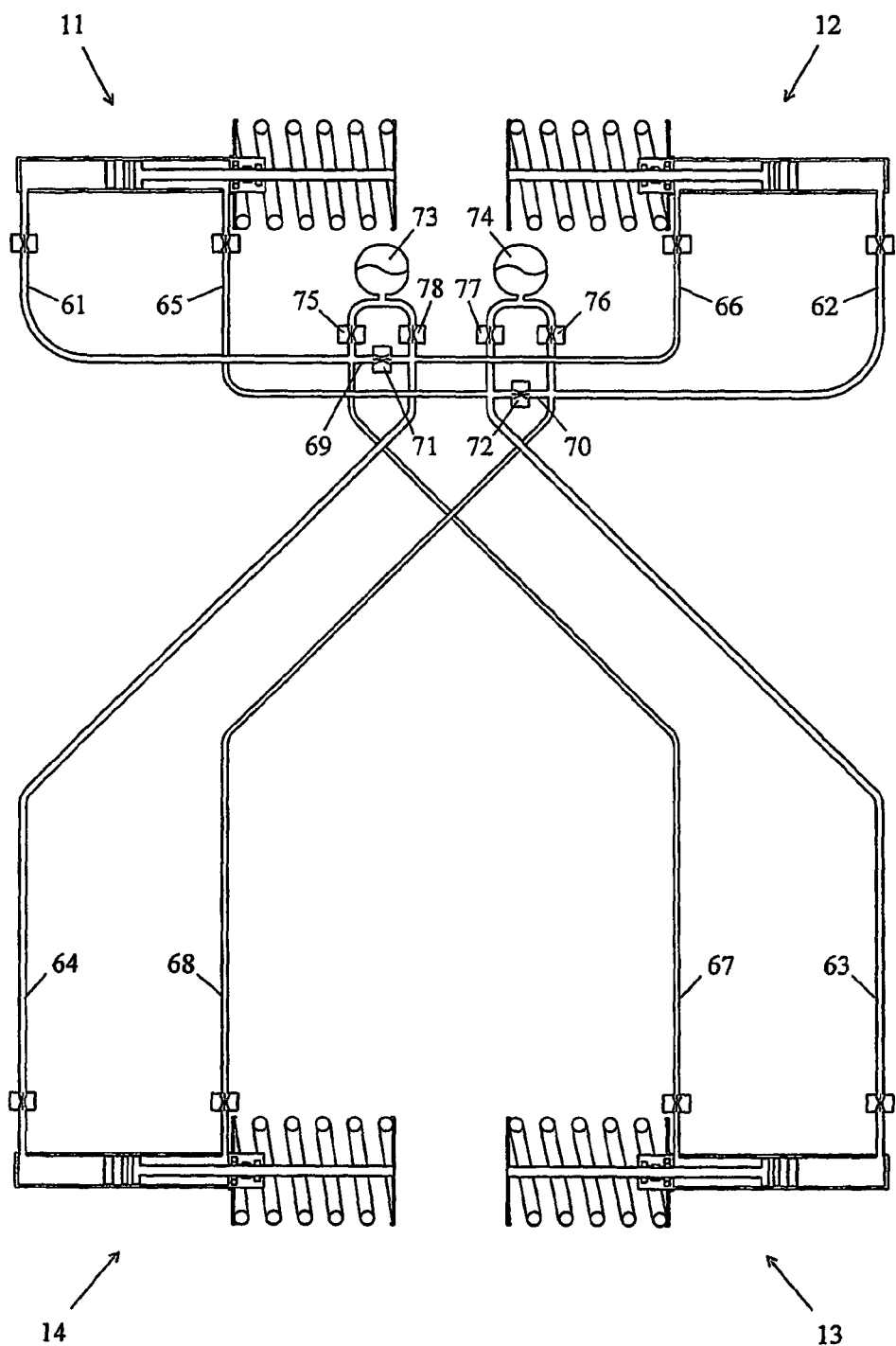

FIG. 4 shows a further alternative layout of FIG. 1, although in this case, the components and their connection sequence is identical to FIG. 1. The reference numerals used correspond to the equivalent parts in FIG. 1. This shows how changing the direction that the plumbing runs in, but not the connection sequence, can reduce fluid flows around the hydraulic system to provide better response. By linking the front wheels with lateral conduits, the fluid flow paths for the front wheels are generally reduced, especially for a front two-wheel input such as a surface change or expansion joint.

Figure 5:
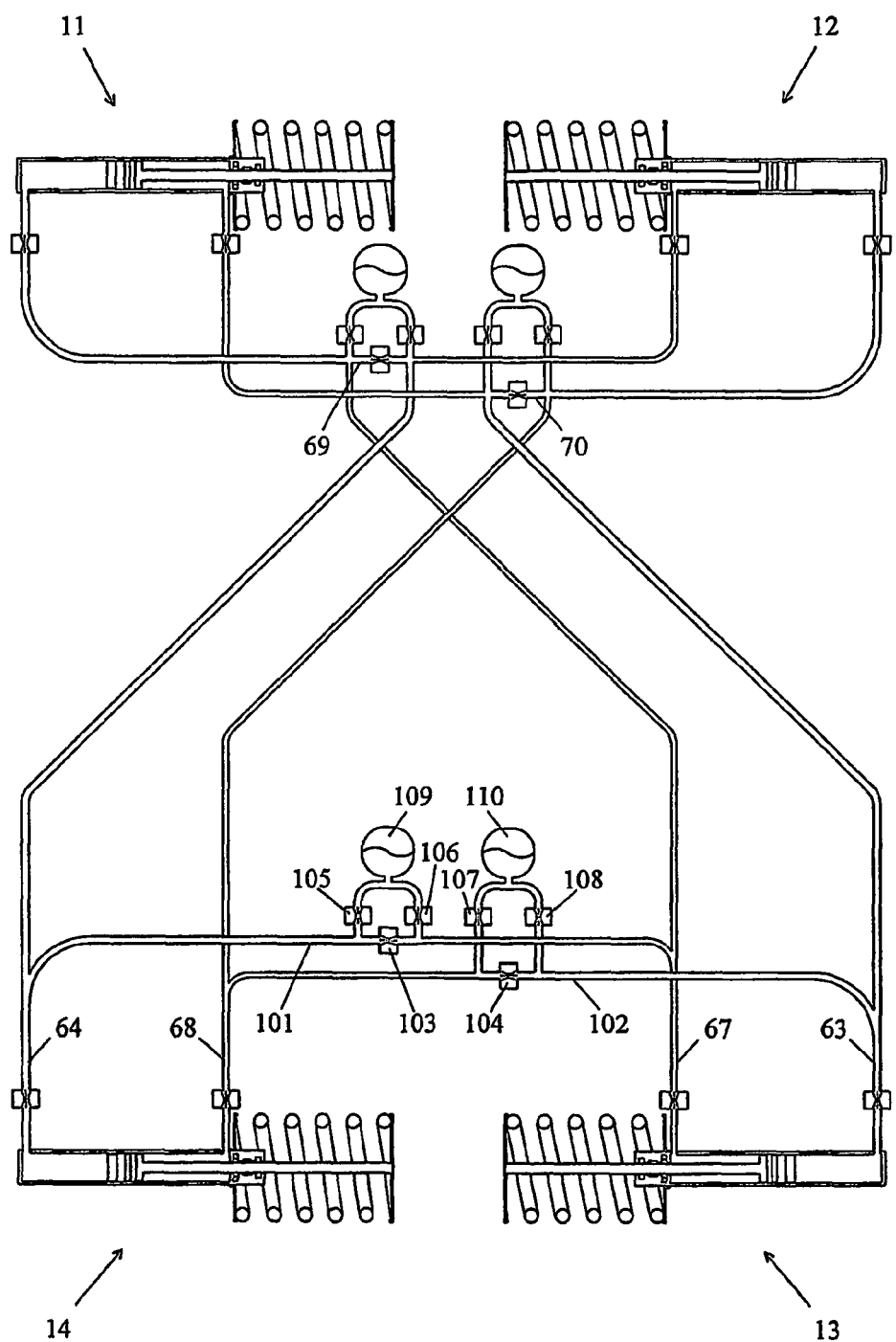

FIG. 5 is a further development of FIG. 4. As the wheelbase of the vehicle is generally longer than the lateral spacing between left and right wheel rams, it can be beneficial for the response, cost and weight compromise of the system to connect the laterally spaced wheels at both the front and rear of the vehicle to reduce the fluid flow required down the conduits running the length of the vehicle. Therefore, additional third and fourth pitch conduits (which are effectively in parallel with the first and second pitch conduits) have been added to cross-connect the chambers of the back wheel rams and similarly improve the rear two-wheel input response of the hydraulic system. The third pitch conduit 101 (which is in parallel with the first pitch conduit 69) connects the back left compression conduit 64 with the back right rebound conduit 67 via third pitch valve 103 which has a third accumulator 109 in parallel, with roll damping valves 105, 106 in series with the accumulator 109. Similarly, the fourth pitch conduit 102 (which is in parallel with the second pitch conduit 70) connects the back right compression conduit 63 with the back left rebound conduit 68 via fourth pitch damper valve 104 which has a fourth accumulator 110 in parallel. Roll damping valves 107, 108 are in series with the accumulator 110 as they are in the arrangements at the front of the vehicle.

Figure 6:
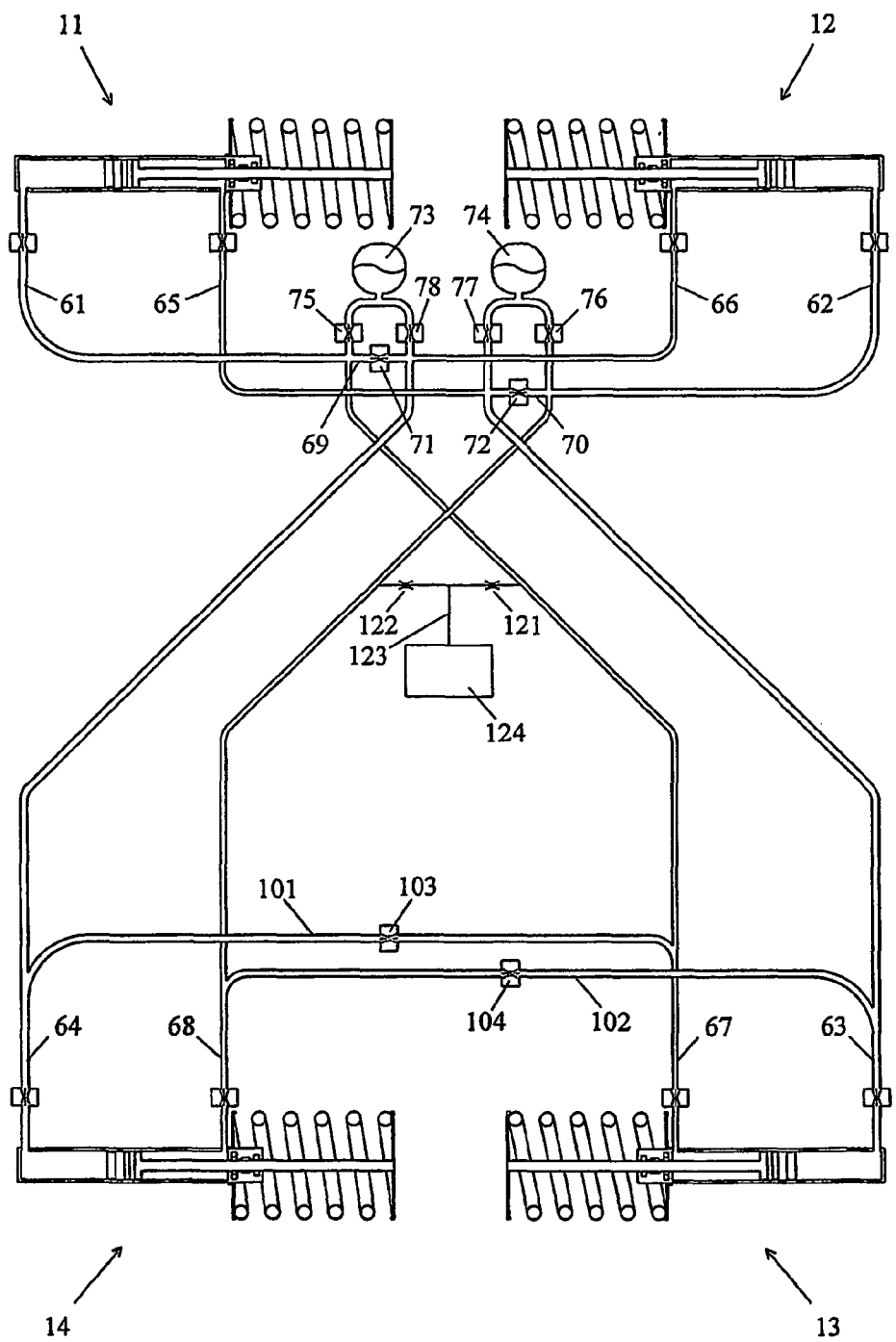

A preferred simplification of this system arrangement is shown in FIG. 6. The rear accumulators have been omitted, along with the damper valves which connected them to the third and fourth pitch conduits 101, 102. Although these omissions reduce cost, it may not always be practical to size the hydraulic suspension system for the optimum performance without the rear accumulators on some vehicles (i.e. some trucks and long wheelbase luxury vehicles).

Also shown in FIG. 6 is a pressure maintenance system. As the hydraulic system is not the primary means of support (ie the coil springs—or air, torsion, etc. springs provide a large portion of the vehicle support) both of the volumes in the system (the previously defined left and right compression volumes) can be operated at a common static pre-charge pressure. The advantage of operating both systems at the same static pre-charge pressure is that pressure differentials across piston seals throughout the system are eliminated and so therefore are roll attitude changes caused by fluid leakage between the systems, and the need for a powered control system which can pump fluid between the volumes.

The left and right compression volumes are connected via restrictions (121, 122) to a common conduit or passage 123 which is in turn connected to a pressure maintenance device 124. Each restriction is typically a micro orifice with filters either side to prevent blockage, although any known restrictive means may be used. The orifice is sized to provide the characteristics required to maintain the pressures in the left and right compression volumes within an acceptable range whilst preventing significant fluid flow during cornering to maintain the static roll attitude within an acceptable range when returning to straight line running.

Although the pressure maintenance device 124 may be omitted, changes in the volumes of fluid and gas in the hydraulic system and its accumulators through the operating temperature range of the vehicle are usually large enough to require some form of compensation device. The complexity of this device can vary significantly, depending on the design parameters and the functionality required.

In its simplest form, the pressure maintenance device (124) can be a simple accumulator with any known construction (for example bladder-type with gas spring, piston-type with gas spring or with mechanical spring).

Alternatively the pressure maintenance device (124) can use a fluid pressure source (such as a tank with a pump, or another vehicle system such as the power steering) to maintain the pressure in the hydraulic suspension volumes to either a fixed or a variable pressure. If a fixed pressure is chosen, the components required can be simple, cheap, passive, mechanical parts, however as the system temperature changes, the system stiffness will change slightly. To maintain the system stiffness characteristics constant with varying temperature, the pressure in the systems must be adjusted in dependence on their temperature, which generally requires one or more temperature sensors, at least one variable pressure switch or pressure transducer and an electronic control unit.

Also, the roll stiffness of the hydraulic suspension system can be adjusted by changing the pressure in the systems, so if a pressure maintenance device (124) with variable pressure set-points is used, the pressure can be varied in dependence on the load in the vehicle and/or by a driver operated mode selector or a variable selector.

Obviously, if the pressure maintenance device is designed to provide two regulated pressures and is connected to the left and right compression volumes by independent conduits (with or even without restrictions) then the pressures in the two volumes can be controlled to be different to each other to offset a static roll load on the vehicle for example due to an offset payload. Alternatively, or additionally, active roll control components can be added on to the system to provide an offset in the passive roll angle of the vehicle during turning, or completely compensate for all resilience in the hydraulic system and maintain a zero roll angle. The components (pump, tank, valves, sensors and controllers for many different algorithms) are all well known.

Figure 7:
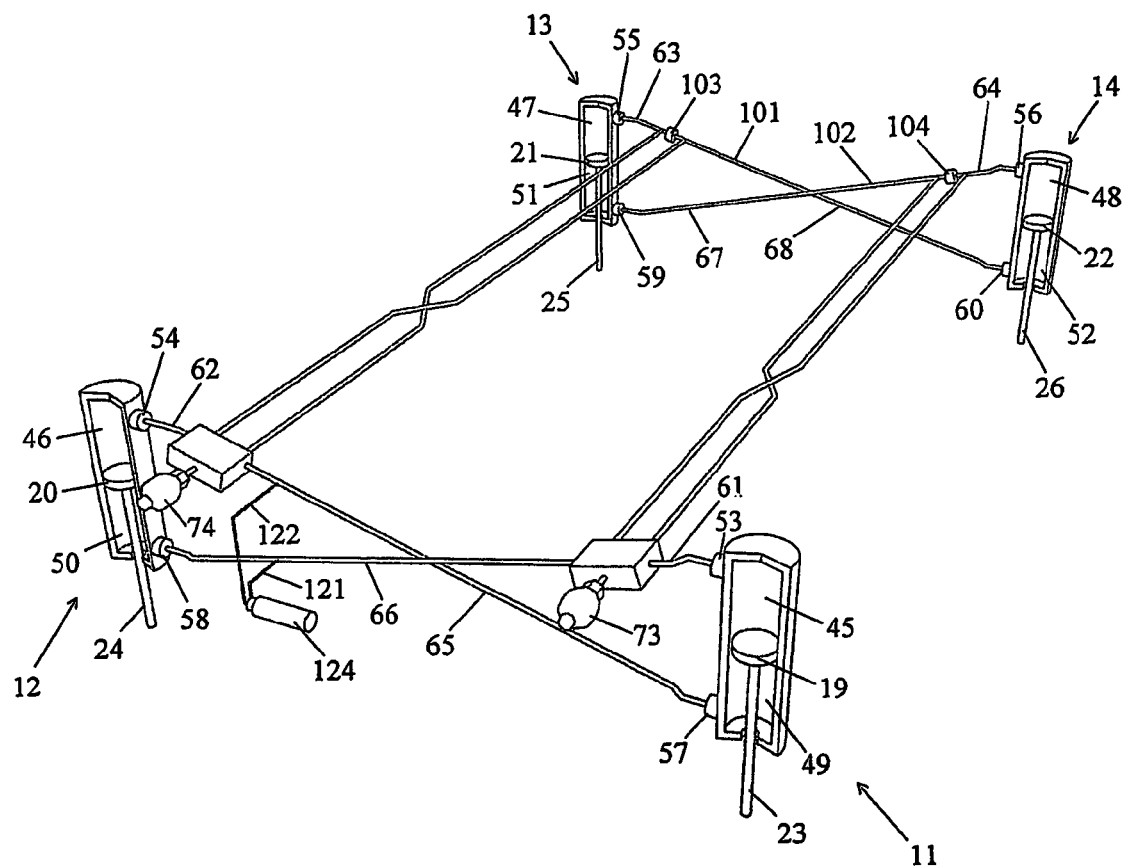

FIG. 7 is a three-dimensional view of the components shown in schematic form in FIG. 6. The components are located in their approximate relative positions as they would be installed on a typical vehicle.

Figure 8:
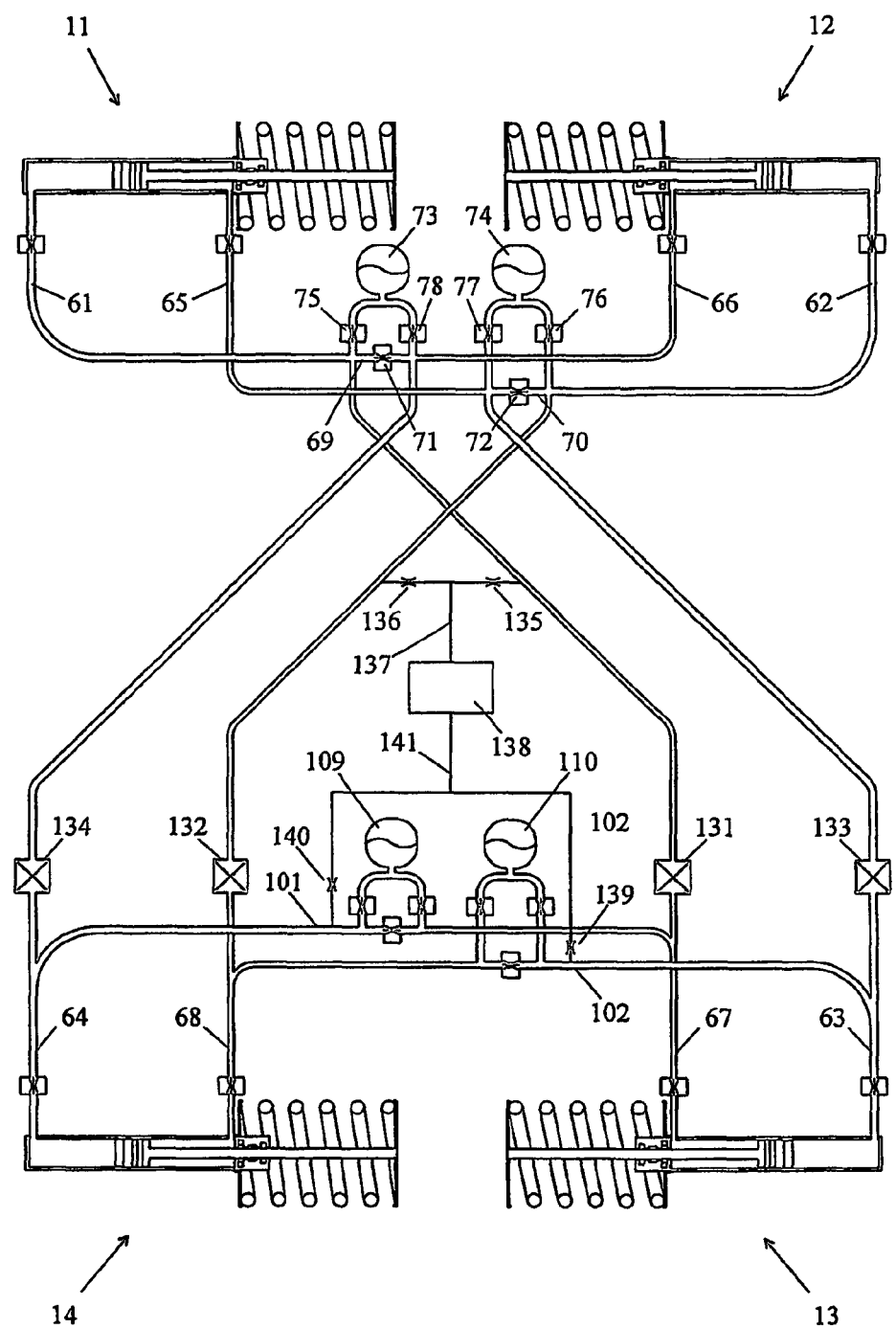

FIG. 8 shows a more complex improvement of the hydraulic system. The front and rear laterally cross-connected arrangements are basically the same as shown in FIG. 5. However front to rear lockout valves 131-134 are provided to allow the front arrangement to and the rear arrangement to operate separately. When the valves are closed, the hydraulic system provides front and rear roll stiffness, front and rear roll damping, warp stiffness, pitch damping and low to negligible heave and pitch stiffness. The valves 131-134 may be used to prevent free warp motions at undesirable times (i.e. wheel lift). Alternatively or additionally, the valves may be used to isolate the front and rear arrangements and form four volumes in the event of a system failure. Additionally or alternatively, it may be desirable, if some form of active pressure control is available, to control the front and rear pressures independently, to thereby influence the roll moment distribution of the hydraulic system and therefore the dynamic behaviour of the vehicle.

Also shown in FIG. 8 is a version of the pressure maintenance system adapted for use on the system with the valves 131-134 closed forming four volumes. The front two volumes are connected to the each other through restrictions 135, 156 and through a passage or conduit 137 to the pressure maintenance unit 138. The two rear volumes are similarly connected to each other through restrictions 139, 140 and through a passage or conduit 141 to the pressure maintenance unit 138. If the valves 131-134 are used as a failsafe, then the pressure maintenance unit 138 should be equipped to maintain the pressure in passage 137 independently of maintaining the pressure in passage 141. Alternatively, an additional pressure maintenance unit (not shown, but ie a simple accumulator) could be provided for the rear volumes, separate to that for the front volumes. Alternatively, the pressure maintenance unit could be used to maintain the pressure in the volumes at only one end of the vehicle (for example being connected to only the front volumes), then it would maintain the pressure in the whole system during normal operation when the lockout valves are open and when the lockout valves have only been closed for brief periods (for wheel lift limitation), only being unable to maintain the pressure in all four systems in the event of a failure. Alternatively the pressure maintenance unit could be much more complex and have individual connections to each of the four volumes (two front and two rear) for controlling the pressure individually to allow for active or passive roll attitude correction and/or selectable roll stiffness and roll moment distribution.

Figure 9:
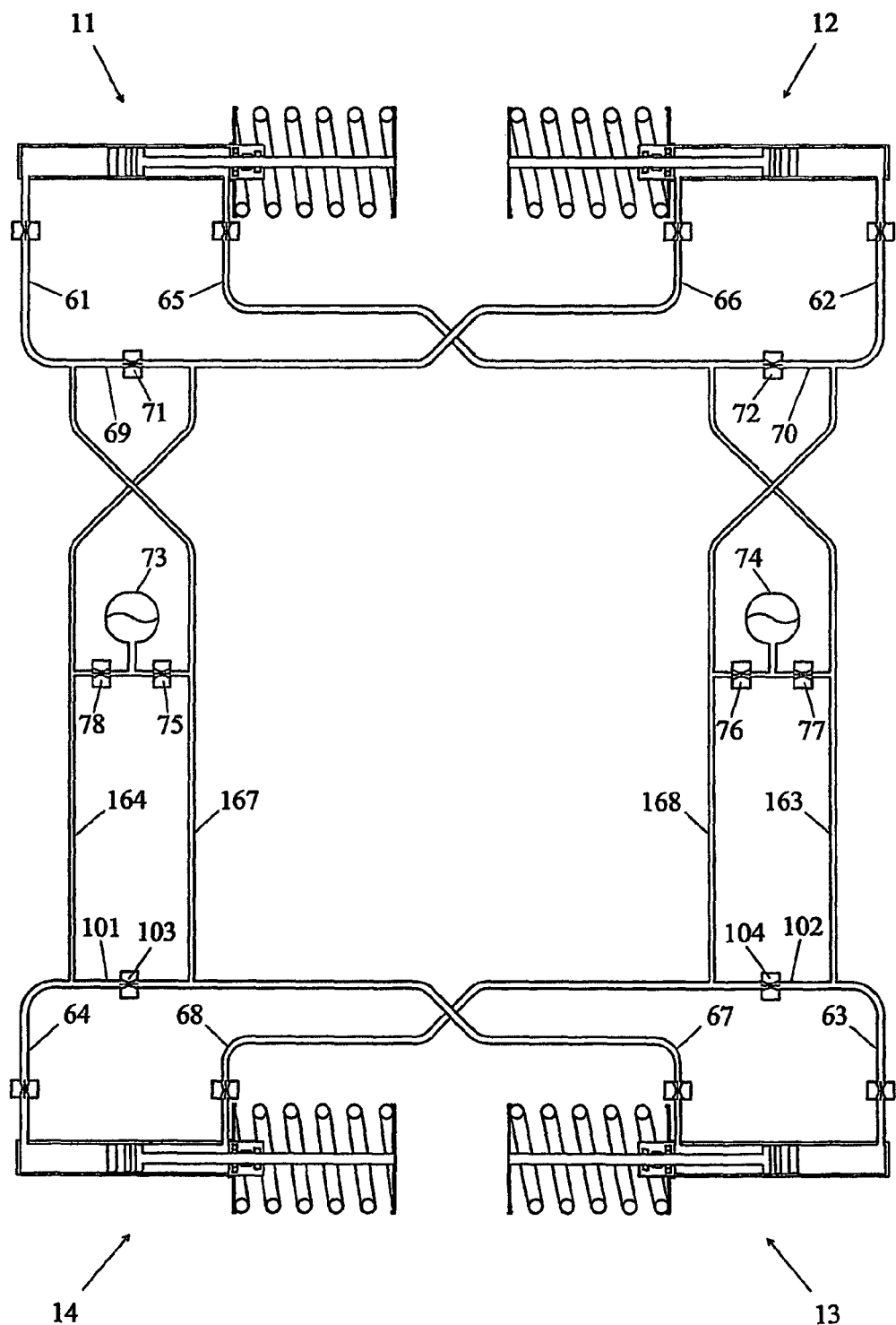

An alternative layout of the system can be seen in FIG. 9. This is essentially the same as the layout in FIG. 6, the most significant difference being the accumulators 73 and 74 and the accumulator damper valves 75, 76, 77 and 78 al all moved rearwards on the vehicle. Instead of the accumulator and accumulator damper assembly being on the front compression conduits 61 and 62, it has been relocated between the longitudinal conduits 163, 164, 167 and 168. Note that each longitudinal conduit is connected directly to a conduit from a wheel ram chamber which can be used to denote the conduit, i.e. 167 and 168 are front compression longitudinal conduits being connected directly to the front compression conduits 61, 62 and the back rebound conduits 67, 68. Similarly, 163 and 164 are back compression longitudinal conduits, being directly connected to the back compression conduits 63, 64 and the front rebound conduits 65, 66. This connectivity is equivalent to that of FIG. 6, however it has the benefit of moving the accumulators back to be between the front and rear wheel rams. It is possible to design the cylinder and conduit sizes such that only two accumulators are needed on the vehicle with acceptably high system natural frequencies and response time, but in order to minimise the operating pressure and conduit diameter, it can be advantageous to position the accumulators at a position which is a portion of the distance between the front and rear wheels. It can also be beneficial to package the accumulators under the floor or under the front foot-well area for example, to free space in the engine bay.

Figure 10:
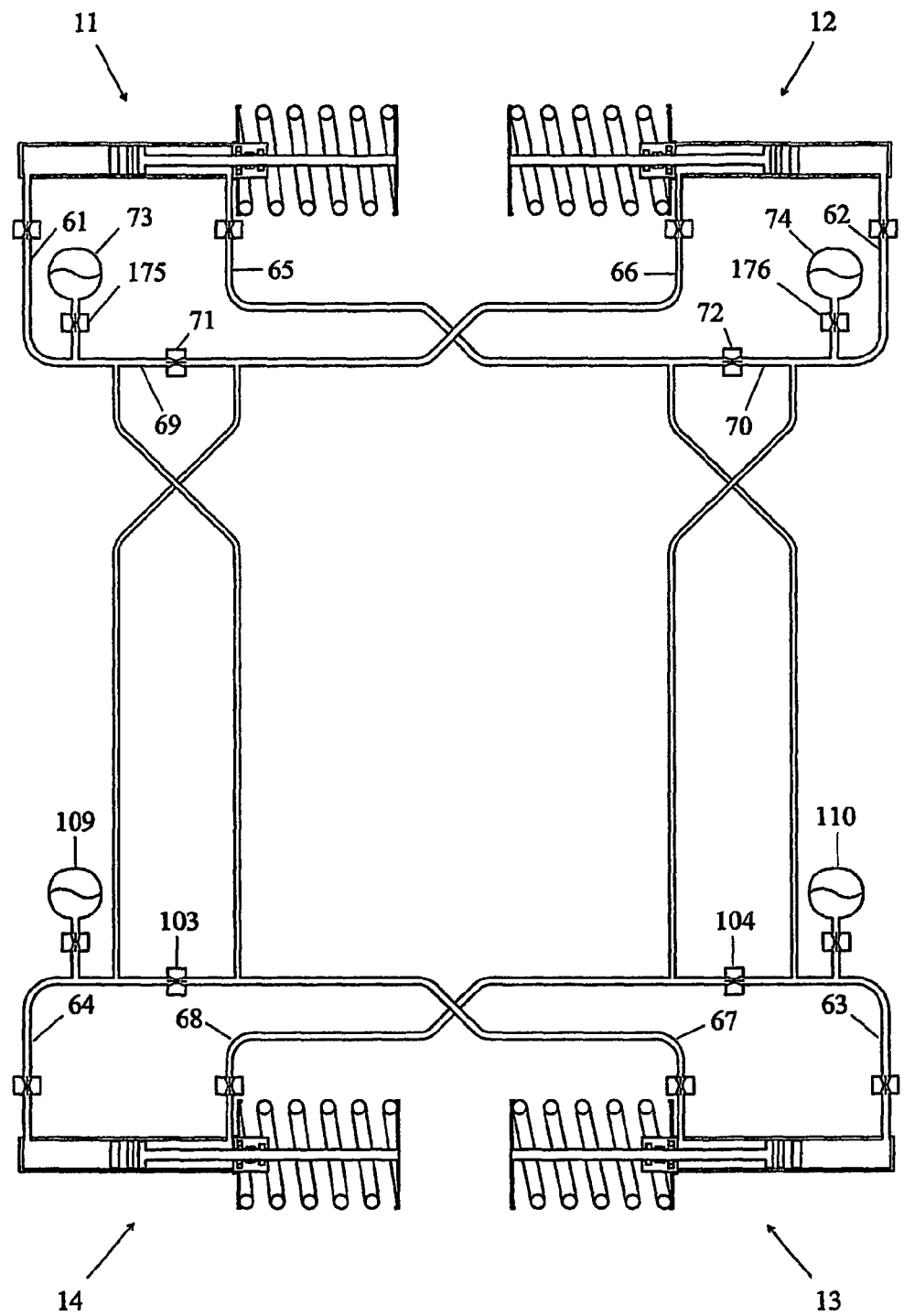

A further alternative layout of the system is shown in FIG. 10. While the basic layout is the same as FIG. 9, the accumulator and accumulator damper positions are different. Four accumulators 73, 74, 109 and 110 are located at the front and rear, as in FIGS. 5 and 8. In this case however, the accumulators are located between the compression chamber of the nearest wheel ram and the pitch damper, rather than parallel to the pitch damper. In the previous arrangements, the accumulator dampers were in parallel to the pitch dampers, so the pitch damping performance was affected by the accumulator dampers. In the arrangement in FIG. 10 the pitch dampers 71, 72, 103 and 104 are direct acting and therefore more effective and unaffected by the accumulator dampers. The accumulator dampers 175, 176, 177 and 178 still damp roll motions more than any other mode.

Throughout all of the preceding drawings, as already discussed, each damper valve indicated can be either: a single damper valve having the same characteristics in both directions; a single valve having different characteristics from one direction of fluid flow to the other; a single valve having flow restriction characteristics in one direction and being relatively free-flowing in the opposite direction; two single-acting valves, one damper valve to control the restriction to flow in one direction and a second damper valve to control the restriction to flow in the opposite direction, the two valves being used in parallel, or in series with a non-return valve in parallel with each valve as is known in conventional damper valve technology.

Figure 11:
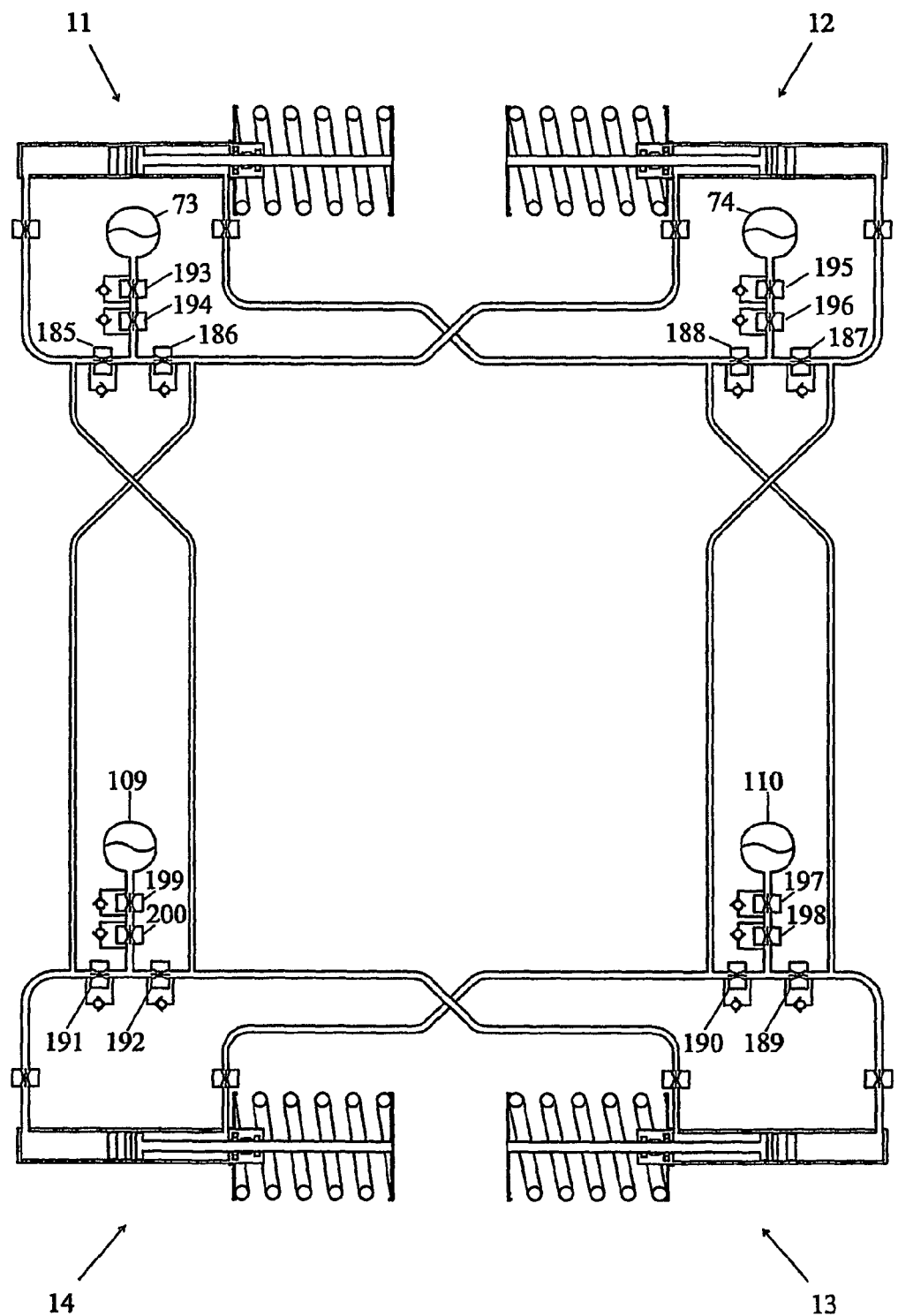

FIG. 11 shows an alternative arrangement of the hydraulic system. This alternative arrangement is similar to the other arrangements disclosed, but shows a modification possible when each damper valve is considered as at least one single direction restriction, as previously discussed in relation to FIG. 1. The restriction symbol with a non-return valve in parallel, as used in this figure is commonly used to denote the base valve of a twin tube damper. These base valves have a valve stack on one side of the damper body and a lightly sprung intake plate on the other side of the damper body, the intake plate acting as a non-return valve. The restriction can be of any type such as a simple orifice, multi-stage, variable or switched.

The modification is to position the accumulator 73, 74, 109 or 110 between two halves of the pitch damper 185 and 186, 187 and 188, 189 and 190, or 191 and 192. If all valves used are single-acting, this modification can reduce the number of valves required, compared to most other arrangements of the hydraulic system. The active direction of each pitch damper valve 185-192 can be reversed from that shown if desired. Two accumulator damper valves 193 and 194, 195 and 196, 197 and 198, 199 and 200 are also shown between each accumulator and the system. It should however be noted that it is also possible to use only one accumulator damper valve. For example, if the compression direction damper valve (193, 195, 197, 199) is omitted, the vehicle height will temporarily reduce as the vehicle rolls. In FIG. 11 as with the previous figures, unless lockout valves are provided to separate the system into more than two fluid volumes, then only two accumulators (one per fluid volume) are necessary.

Lockout valves can be provided in alternative positions to those shown in FIGS. 3 and 8. As mentioned previously, the valves can be used in the event of a detected loss of fluid pressure in one of the fluid volumes, or the fluid pressure not matching a mapped fluid pressure for the dynamic conditions on a vehicle, ie in the event of a system failure or malfunction. The valves can also be used when the dynamic conditions on a vehicle or a combination of for example lateral acceleration and throttle or brake position are used to indicate that wheel lift is likely to occur, in which case, the lockout valves can be closed to increase the stability of the vehicle. For example, the pitch damper valves can either have one or more lockout valves in series with them (similar to their connection sequence in FIG. 3, so in lines 69, 70, 101 and 102 in FIG. 10 for example), or the pitch damper valves themselves can be switchable or variable valves that can be controlled to completely block fluid flow through the valve.

An alternative method of changing the roll stiffness of the hydraulic system is to use additional accumulators which can be connected to the hydraulic system through switchable lockout valves. This allows for the roll stiffness to be switched between a high and a low setting. These settings are generally either side of what would be chosen as a multi-purpose single setting, so that the system can provide improved handling and control with high stiffness and improved comfort with low stiffness, as selected or controlled automatically by any known means (acceleration sensors, throttle and brake sensors, position sensors, etc). An alternative to hydraulically switching a whole accumulator in and out of the systems, is to use an accumulator design with two gas volumes, then simpler, cheaper gas switching valves can be used to vary the gas volumes available to the systems by switching the lock-out valve to between the two gas volumes to isolate one of the volumes.

A further alternative method to switch the roll stiffness is to employ 'bridging valves' which connect the two (i.e. the left and right compression) volumes together. This method can be employed more cheaply (only the bridging valves are required), but it removes all roll stiffness and the roll damping effect of the accumulator damper valves from the hydraulic system. Generally, it is cheapest to connect the bridging valves between the front and/or rear compression conduits 61 and 62 and/or 63 and 64. A further alternative is to design a controlled switchable or variable bypass valve into the piston between the compression and rebound chamber of each wheel ram. As this effectively short-circuits the system, it reduces fluid flow through the system greatly and can give the best comfort performance given the low fluid accelerations. Ideally the control is electronic, sensing steering angle and/or steering velocity, vehicle speed and lateral acceleration.

Many other obvious alterations to the basic arrangement of the components whilst maintaining the connection sequence essential for the functionality of the hydraulic system are considered to fall within the scope of this application. For example, it is obvious that, in a production design of the system, it is possible to incorporate not only the wheel damper valves (53-60) into the main body of the wheel ram, but also the accumulators, roll and pitch valves. For example, the front left wheel ram may include the wheel damper valves 53 and 57, the accumulator 73, the roll damping valves 75 and 78 and the pitch damping valve 71.

The claims defining the invention are as follows:

1. A hydraulic system for a vehicle suspension for a vehicle, the vehicle including a vehicle body and at least two forward and two rearward wheel assemblies, the vehicle suspension including front and rear resilient vehicle support means between the vehicle body and the wheel assemblies for resiliently supporting the vehicle above the wheel assemblies, the hydraulic system including:

at least two front and two rear wheel rams respectively located between the wheel assemblies and the vehicle body, each ram including at least a compression chamber and a rebound chamber;

wherein the compression chamber and rebound chamber of each of said front wheel rams is in fluid communication with the rebound chamber and compression chamber respectively of a diagonally opposed rear wheel ram to respectively provide a first and a second fluid circuit, each fluid circuit providing a front and back compression volume therein, the front compression volume of one of said fluid circuits being in fluid communication with the back compression volume of the other of said fluid circuits, and wherein damping means are provided for damping fluid flow within each compression volume and between the front and back compression volumes, such that suspension parameters provided by the hydraulic system can be independently tuned from each other; and wherein at least one pitch damper valve is disposed between the first and the second fluid circuits to damp fluid flow between the front and back compression volumes of the respective first and second fluid circuits giving pitch control such that the suspension roll stiffness, roll damping, pitch damping and heave damping provided by the hydraulic system can be independently tuned from each other.

2. A hydraulic system as claimed in claim 1 wherein the vehicle is primarily supported by the resilient vehicle support means.

3. A hydraulic system as claimed in claim 1 wherein each fluid circuit further includes at least one accumulator in fluid communication with said circuit.

4. A hydraulic system as claimed in claim 3 wherein accumulator damping means are provided for damping the fluid flow between at least one accumulator and its respective circuit.

5. A hydraulic system as claimed in claim 1 wherein the fluid communication between the front compression volume of the first fluid circuit and the rear compression volume of the second fluid circuit is provided by a first pitch conduit and the fluid communication between the front compression volume of the second fluid circuit and the rear compression volume of the first fluid circuit is provided by a second pitch conduit.

6. A hydraulic system as claimed in claim 5 wherein the at least one pitch damper valve includes a pitch damper valve located in each of the first and second pitch conduits.

7. A hydraulic system as claimed in claim 6 wherein each front compression volume includes a front ram compression chamber, a front compression conduit, a rear rebound conduit, and a rear ram rebound chamber, and
each rear compression volume includes a rear ram compression chamber, a rear compression conduit, a front rebound conduit, and a front ram rebound chamber.

8. A hydraulic system as claimed in claim 7 including a first pitch conduit provided between the front compression conduit of the first fluid circuit and the rear compression conduit of the second fluid circuit, and
a second pitch conduit provided between the front compression conduit of the second fluid circuit and the rear compression conduit of the first fluid circuit.

9. A hydraulic system as claimed in claim 7, each front compression volume further including a front compression longitudinal conduit, each rear compression volume further including a rear compression longitudinal conduit.

10. A hydraulic system as claimed in claim 9 including: a first front pitch conduit having a first end connected to the front compression conduit and the front compression longitudinal conduit of the first fluid circuit and a second end connected to the front rebound conduit and the rear compression longitudinal conduit of the second fluid circuit; and
a second front pitch conduit having a first end connected to the front compression conduit and the front compression longitudinal conduit of the second fluid circuit and a second end connected to the front rebound conduit and the rear compression longitudinal conduit of the first fluid circuit.

11. A hydraulic system as claimed in claim 10, including: a first rear pitch conduit having a first end connected to the rear compression conduit and the rear compression longitudinal conduit of the second fluid circuit and a second end connected to the rear rebound conduit and the front compression longitudinal conduit of the first fluid circuit; and
a second rear pitch conduit having a first end connected to the rear compression conduit and the rear compression longitudinal conduit of the first fluid circuit and a second end connected to the rear rebound conduit and the front compression longitudinal conduit of the second fluid circuit.

12. A hydraulic system as claimed in claim 9 including: a first rear pitch conduit having a first end connected to the rear compression conduit and the rear compression longitudinal conduit of the second fluid circuit and a second end connected to the rear rebound conduit and the front compression longitudinal conduit of the first fluid circuit; and
a second rear pitch conduit having a first end connected to the rear compression conduit and the rear compression longitudinal conduit of the first fluid circuit and a second end connected to the rear rebound conduit and the front compression longitudinal conduit of the second fluid circuit.

13. A hydraulic system as claimed in claim 1 further including valves to block the two fluid circuits.

14. A hydraulic system as claimed in claim 1 further including at least one valve to selectively interconnect the front compression volume of one circuit with the front compression volume of the other circuit.

15. A hydraulic system as claimed in claim 1 further including a pressure maintenance device connected to each of the system volumes through respective restrictions or valves.

16. A hydraulic system as claimed in claim 1 wherein the fluid communication between the front compression volume of the one of said fluid circuits and the back compression volume of the other of said fluid circuits allows fluid to flow from the front compression volume of the one of said fluid circuits to the back compression volume of the other of said fluid circuits.

* * * * *